US012159605B2

(12) United States Patent
Hatakenaka et al.

(10) Patent No.: US 12,159,605 B2
(45) Date of Patent: Dec. 3, 2024

(54) UNEVENNESS CORRECTION DATA GENERATION DEVICE

(71) Applicant: IIX INC., Tokyo (JP)

(72) Inventors: Makoto Hatakenaka, Tokyo (JP); Takashi Sakamoto, Tokyo (JP); Hiroshi Murase, Tokyo (JP); Mitsuo Hagiwara, Tokyo (JP); Hideaki Suzuki, Tokyo (JP); Kazunori Yoshizawa, Tokyo (JP)

(73) Assignee: IIX INC., Tokyo (JP)

( * ) Notice: Subject to any disclaimer, the term of this patent is extended or adjusted under 35 U.S.C. 154(b) by 0 days.

(21) Appl. No.: 18/271,594

(22) PCT Filed: Feb. 4, 2021

(86) PCT No.: PCT/JP2021/004165
§ 371 (c)(1),
(2) Date: Jul. 10, 2023

(87) PCT Pub. No.: WO2022/168243
PCT Pub. Date: Aug. 11, 2022

(65) Prior Publication Data

US 2024/0071337 A1 Feb. 29, 2024

(51) Int. Cl.
*G09G 5/10* (2006.01)
*G09G 5/02* (2006.01)

(52) U.S. Cl.
CPC ................. *G09G 5/10* (2013.01); *G09G 5/02* (2013.01); *G09G 2320/0233* (2013.01); *G09G 2320/0626* (2013.01); *G09G 2320/0666* (2013.01)

(58) Field of Classification Search
CPC ............. G09G 5/02; G09G 2320/0233; G09G 2320/0626; G09G 2320/0666; H04N 9/3182; H04N 9/3194
See application file for complete search history.

(56) References Cited

U.S. PATENT DOCUMENTS

2006/0181686 A1* 8/2006 Matsuda ................ G03B 21/14 353/69
2009/0096729 A1 4/2009 Ozawa et al.
(Continued)

FOREIGN PATENT DOCUMENTS

JP 2006-153914 A 6/2006
JP 2009-147431 A 7/2009
(Continued)

OTHER PUBLICATIONS

Apr. 13, 2021 International Search Report issued in International Patent Application No. PCT/JP2021/004165.
(Continued)

*Primary Examiner* — Priyank J Shah
(74) *Attorney, Agent, or Firm* — Oliff PLC

(57) ABSTRACT

An unevenness correction data generation device suppressing the appearance of color unevenness when turning on R, G and B together includes a pattern generation unit causing red, green and blue images, in which display panel subpixels are turned on at the same gray level, to be displayed, a monochrome camera, a control unit generating first red, green and blue luminance correction data based on shooting data of the monochrome camera, a pattern generation unit causing the display panel to display a white image by causing red, green and blue images corrected with the respective luminance correction data to be displayed simultaneously, a color camera shooting the white image in color, and a control unit generating color correction data for correcting color unevenness based on shooting data of the color camera and generates unevenness correction data based on the red, green and blue luminance correction data and the color correction data.

4 Claims, 3 Drawing Sheets

(56) References Cited

U.S. PATENT DOCUMENTS

| | | | | |
|---|---|---|---|---|
| 2014/0232880 | A1* | 8/2014 | Murase | H04N 17/02 348/189 |
| 2023/0079286 | A1* | 3/2023 | Wang | G09G 3/3225 345/690 |

FOREIGN PATENT DOCUMENTS

| | | | |
|---|---|---|---|
| JP | 2013-250570 | A | 12/2013 |
| WO | 2014/128821 | A1 | 8/2014 |

OTHER PUBLICATIONS

Apr. 13, 2021 Written Opinion of the International Searching Authority issued in International Patent Application No. PCT/JP2021/004165.

* cited by examiner

UNEVENNESS CORRECTION DATA GENERATION DEVICE

TECHNICAL FIELD

The present invention relates to an unevenness correction data generation device that generates unevenness correction data for correcting unevenness (mura) of a display panel.

BACKGROUND ART

Display panels such as liquid crystal panels and organic EL panels are known to suffer from display unevenness (luminance unevenness, color unevenness) caused by variation in manufacturing processes. In the case where each pixel of the display panel has R, G and B subpixels, luminance unevenness occurs when there is a difference in absolute brightness between adjacent pixels, even though the relative brightness relationship of R, G and B in the individual pixels does not differ. Also, color unevenness occurs when the relative brightness relationship of R, G and B in the individual pixels differs between adjacent pixels. In particular, with organic EL panels, it is difficult to achieve uniform thickness of an organic compound layer of the pixels, and thus display unevenness caused by irregular layer thickness tends to occur, and increasing the screen size has been problematic.

As a technology for improving the image quality of display panels by reducing such display unevenness, there is, for example, an image correction data generation system described in Patent Document 1. In this system, a test pattern is displayed by supplying a common signal value to the entire screen of the display panel, an image of the displayed test pattern is captured by a camera, and processing such as bandpass filtering is executed on the image captured by the camera to generate unevenness correction data ("correction data" in Patent Document 1) for reducing unevenness of the display panel. When a correction circuit storing this unevenness correction data is incorporated into a display panel, input signals of the display panel are corrected, and the image quality of the display panel is improved.

CITATION LIST

Patent Document

Patent Document 1: JP 2013-250570A

SUMMARY OF INVENTION

Technical Problem

Incidentally, the luminance of the R, G and B subpixels may differ between when the subpixels are turned on separately per color and when the subpixels of all colors are turned on together, with this conceivably being caused by the current consumption of the display panel changing between when the subpixels are turned on separately and when the subpixels are turned on together, resulting in a difference in voltage drop (so-called IR drop).

Accordingly, even if unevenness correction data is generated by turning on the R, G and B subpixels separately and correction using this unevenness correction data is performed, the balance of R, G and B may be lost when the subpixels are turned on together, and color unevenness (color distortion) may appear due to a shift in white balance.

The present invention has been made in view of the above circumstances, and an object thereof is to provide an unevenness correction data generation device that is able to suppress the appearance of color unevenness when R, G and B are turned on together.

Solution to Problem

In order to solve the above problem, an unevenness correction data generation device according to the present invention includes a raster image generation means for causing a display panel having pixels each including an R subpixel, a G subpixel and a B subpixel to separately display a red image in which all the R subpixels are turned on at the same gray level, a green image in which all the G subpixels are turned on at the same gray level, and a blue image in which all the B subpixels are turned on at the same gray level, a monochrome shooting means for separately shooting, in monochrome, the red image, green image and blue image displayed on the display panel, a luminance correction data generation means for generating, for the R subpixels, first red luminance correction data for correcting luminance unevenness, based on shooting data of the red image shot by the monochrome shooting means, generating, for the G subpixels, first green luminance correction data for correcting luminance unevenness, based on shooting data of the green image shot by the monochrome shooting means, and generating, for the B subpixels, first blue luminance correction data for correcting luminance unevenness, based on shooting data of the blue image shot by the monochrome shooting means, a white image generation means for causing the display panel to display a white image, by causing the display panel to simultaneously display a red image corrected with the first red luminance correction data, a green image corrected with the first green luminance correction data and a blue image corrected with the first blue luminance correction data, a color shooting means for shooting, in color, the white image displayed on the display panel by the white image generation means, a color correction data generation means for generating color correction data for correcting color unevenness of the display panel, based on shooting data of the white image shot by the color shooting means, and an unevenness correction data generation means for generating unevenness correction data for use in correcting an input signal of the display panel, based on the first red luminance correction data, the first green luminance correction data, the first blue luminance correction data, and the color correction data.

The color shooting means may include a red luminance detection element configured to detect a luminance of the red image constituting the white image, a green luminance detection element configured to detect a luminance of the green image constituting the white image, and a blue luminance detection element configured to detect a luminance of the blue image constituting the white image, the color correction data generation means may generate the color correction data, by generating, for the R subpixels, second red luminance correction data for correcting luminance unevenness, based on shooting data of the red image detected by the red luminance detection element, generating, for the G subpixels, second green luminance correction data for correcting luminance unevenness, based on shooting data of the green image detected by the green luminance detection element, and generating, for the B subpixels, second blue luminance correction data for correcting luminance unevenness, based on shooting data of the blue image detected by the blue luminance detection element, and the unevenness correction data generation means may generate the unevenness correction data, by synthesizing the first red luminance correction data and the second red luminance correction data, synthesizing the first green luminance correction data and the second green luminance correction data, and synthesizing the first blue luminance correction data and the second blue luminance correction data.

Also, the unevenness correction data generation means may generate the unevenness correction data, by applying a red high pass filter to the first red luminance correction data and applying a red low pass filter to the second red luminance correction data to synthesize the first red luminance correction data and the second red luminance correction data, applying a green high pass filter to the first green luminance correction data and applying a green low pass filter to the second green luminance correction data to synthesize the first green luminance correction data and the second green luminance correction data, and applying a blue high pass filter to the first blue luminance correction data and applying a blue low pass filter to the second blue luminance correction data to synthesize the first blue luminance correction data and the second blue luminance correction data, and the red high pass filter and the red low pass filter may have complementary characteristics whose gains add up to 1, the green high pass filter and the green low pass filter may have complementary characteristics whose gains add up to 1, and the blue high pass filter and the blue low pass filter may have complementary characteristics whose gains add up to 1.

Advantageous Effects of Invention

With the unevenness correction data generation device according to the present invention, the appearance of color unevenness when R, G and B are turned on together can be suppressed.

DESCRIPTION OF EMBODIMENTS

A mode for carrying out the present invention will be described with reference to the drawings.

Figure 1:
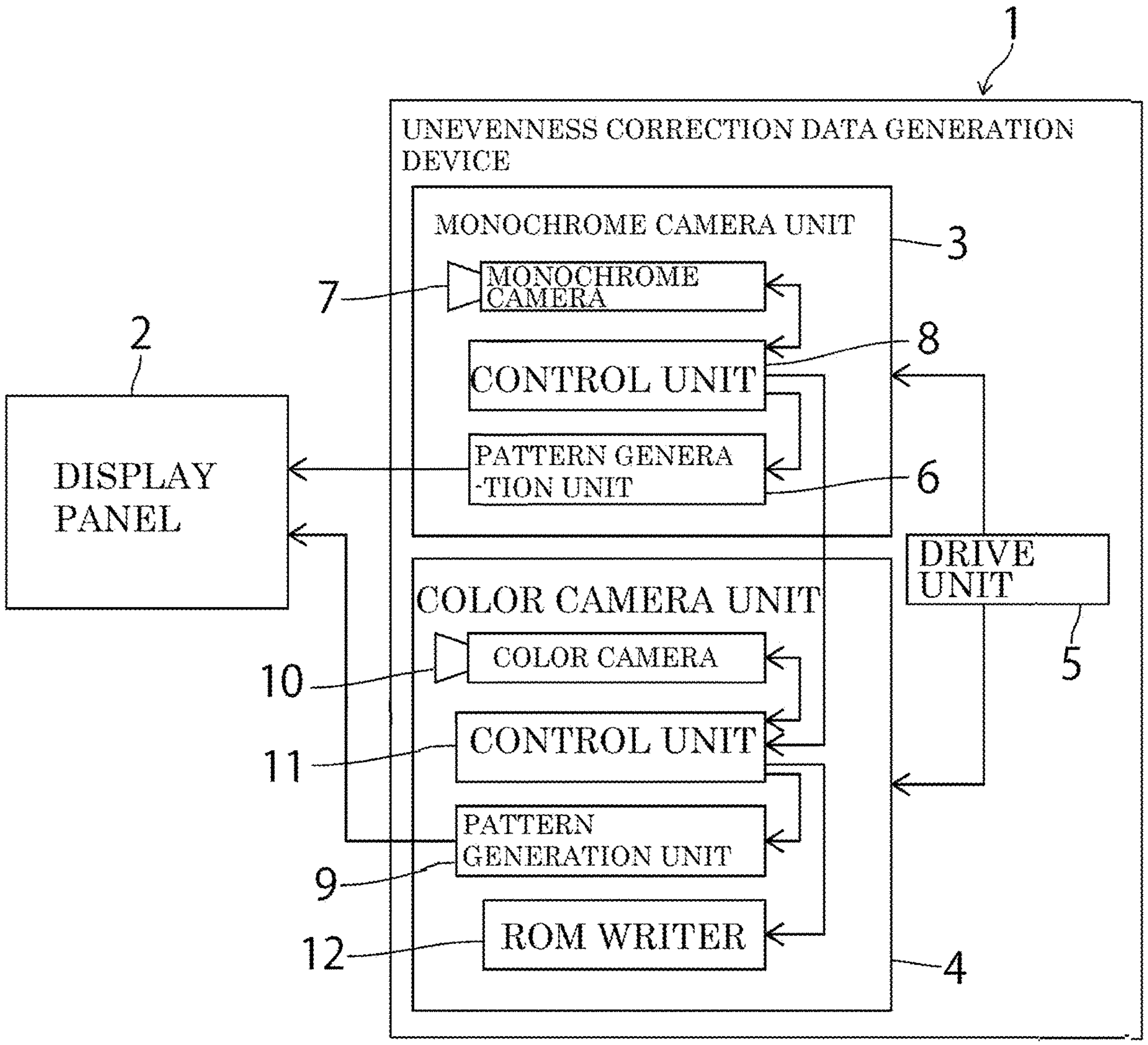
FIG. 1 is an illustrative diagram showing an unevenness correction data generation device according to a mode for carrying out the invention.

FIG. 1 shows an unevenness correction data generation device according to this mode. This unevenness correction data generation device 1 causes a display panel 2 having pixels that each include R, G and B subpixels to display various patterns, causes a monochrome camera unit 3 and a color camera unit 4 to shoot images of the patterns, and generates unevenness correction data for reducing display unevenness of the display panel 2. The generated unevenness correction data is stored in a ROM (non-volatile memory) of an image quality adjustment circuit not shown, and a display panel with image quality adjustment is produced due to this image quality adjustment circuit being attached to the display panel 2. In this display panel with image quality adjustment, reduction of display unevenness of the display panel 2 is achieved and image quality is adjusted, due to the image quality adjustment circuit correcting the image signals (input signals) input to the display panel 2 while referring to the unevenness correction data stored in the ROM.

Specifically, the unevenness correction data generation device 1 includes a monochrome camera unit 3, a color camera unit 4, and a drive unit that drives the monochrome camera unit 3 and the color camera unit 4, the monochrome camera unit 3 being provided with a pattern generation unit 6 that is connected to the display panel 2 and causes the display panel 2 to display predetermined patterns, a monochrome camera 7 that shoots images of the display panel 2 in monochrome and a control unit 8, and the color camera unit 4 being provided with a pattern generation unit 9 that is connected to the display panel 2 and causes the display panel 2 to display predetermined patterns, a color camera 10 that shoots images of the display panel 2 in color, a control unit 11, and a ROM writer 12. The color camera 10 includes a red luminance detection element for detecting red luminance, a green luminance detection element for detecting green luminance, and a blue luminance detection element for detecting blue luminance as imaging elements.

At the time of the unevenness correction data generation device 1 generating unevenness correction data, first, the drive unit 5 drives the monochrome camera unit 3 and the color camera unit 4 and causes the monochrome camera 7 to directly face the display panel 2.

Figure 2:
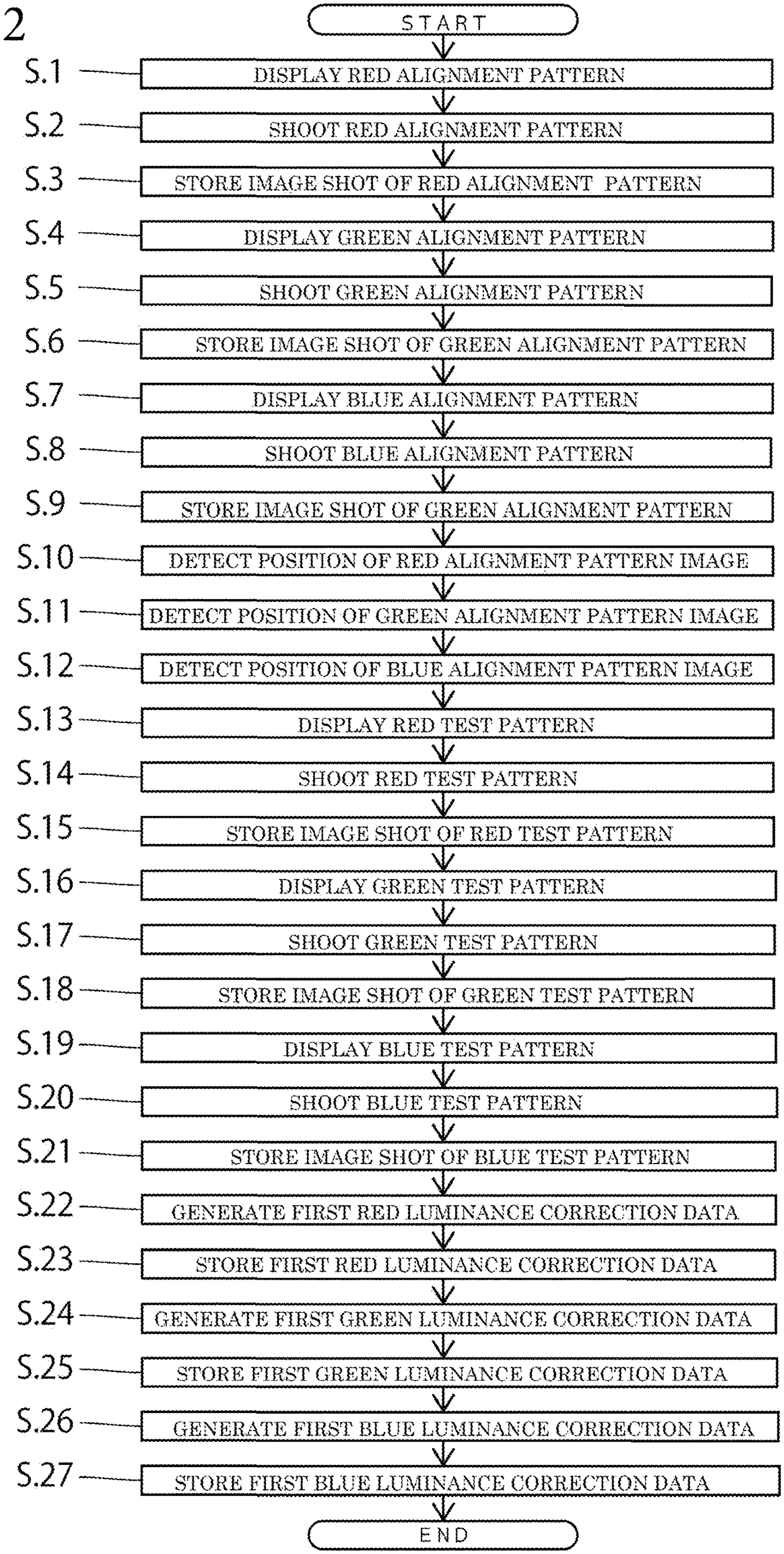
FIG. 2 is a flowchart chronologically showing operations of the unevenness correction data generation device of FIG. 1.

As shown in FIG. 2, the control unit 8 then instructs the pattern generation unit 6 to send an alignment pattern display signal (R signal) to the display panel 2, and causes the display panel 2 to display a red alignment pattern that is formed by turning on specific pixels of the display panel 2 to perform red display (step 1 in FIG. 2 ("S.1" in FIG. 2; this similarly applies below)). The control unit 8 causes the monochrome camera 7 to shoot an image of the display panel 2 on which the red alignment pattern is displayed (step 2), and stores the image shot of the red alignment pattern (step 3).

Next, the control unit 8 instructs the pattern generation unit 6 to send an alignment pattern display signal (G signal) to the display panel 2, and causes the display panel 2 to display a green alignment pattern that is formed by turning on specific pixels of the display panel 2 to perform green display (step 4). The control unit 8 causes the monochrome camera 7 to shoot an image of the display panel 2 on which the green alignment pattern is displayed (step 5), and stores the image shot of the green alignment pattern (step 6).

Then, the control unit 8 instructs the pattern generation unit 6 to send an alignment pattern display signal (B signal) to the display panel 2, and causes the display panel 2 to display a blue alignment pattern that is formed by turning on specific pixels of the display panel 2 to perform blue display (step 7). The control unit 8 causes the monochrome camera 7 to shoot an image of the display panel 2 on which the blue alignment pattern is displayed (step 8), and stores the image shot of the blue alignment pattern (step 9).

After finishing this series of shooting, the control unit 8 detects the position of the image of the red alignment pattern on the imaging surface of the monochrome camera 7, based on the stored image shot of the red alignment pattern (step 10). That is, the control unit 8 detects which imaging element on the imaging surface of the monochrome camera 7 the image of the specific pixels corresponds to at the time of red display, assuming that dots on the image shot of the red alignment pattern correspond to the specific pixels being turned on to perform red display.

Similarly, the control unit 8 detects the position of the image of the green alignment pattern on the imaging surface of the monochrome camera 7, based on the stored image shot of the green alignment pattern (step 11), and detects the position of the image of the blue alignment pattern on the imaging surface of the monochrome camera 7, based on the stored image shot of the blue alignment pattern (step 12).

Having detected the position of the image of each alignment pattern on the imaging surface of the monochrome camera 7, the control unit 8 instructs the pattern generation unit 6 to send a test pattern display signal (R signal) to the display panel 2, and causes the display panel 2 to display a red test pattern (step 13). The red test pattern is a red image that appears red due to all the pixels (all the R subpixels) of the display panel 2 being turned on at the same gray level and is displayed on the entire surface of the display panel 2. The control unit 8 causes the monochrome camera 7 to shoot a monochrome image of the display panel 2 on which the red test pattern is displayed (step 14), and stores the image shot of the red test pattern (step 15).

Also, the control unit 8 instructs the pattern generation unit 6 to send a test pattern display signal (G signal) to the display panel 2, and causes the display panel 2 to display a green test pattern (step 16). The green test pattern is a green image that appears green due to all the pixels (all the G subpixels) of the display panel 2 being turned on at the same gray level and is displayed on the entire surface of the display panel 2. The control unit 7 causes the monochrome camera 7 to shoot a monochrome image of the display panel 2 on which the green test pattern is displayed (step 17), and stores the image shot of the green test pattern (step 18).

Furthermore, the control unit 8 instructs the pattern generation unit 6 to send a test pattern display signal (B signal) to the display panel 2, and causes the display panel 2 to display a blue test pattern (step 19). The blue test pattern is a blue image that appears blue due to all the pixels (all the B subpixels) of the display panel 2 being turned on at the same gray level and is displayed on the entire surface of the display panel 2. The control unit 8 causes the monochrome camera 7 to shoot a monochrome image of the display panel 2 on which the blue test pattern is displayed (step 20), and stores the image shot of the blue test pattern (step 21).

Having shot an image of each test pattern, the control unit 8 generates first red luminance correction data for reducing luminance unevenness at the time of red display of the display panel 2, based on the result of detecting the position of the image of the red alignment pattern in step 10 and the image shot of the red test pattern (step 22) and stores the generated first red luminance correction data (step 23). Specifically, the control unit 8 knows which imaging element of the monochrome camera 7 the specific pixels of the display panel 2 corresponds to, from the result of detecting the position of the image of the red alignment pattern, and is thus also able to derive, for the other imaging elements that do not correspond to the specific pixels, which pixels or regions of the display panel 2 these other imaging elements correspond to, through a computational operation such as interpolation. That is, because the luminance of each pixel or each region of the display panel 2 can be derived, based on the image shot of the red test pattern (based on the amount of light received by each imaging element of the monochrome camera 7 when the image of the red test pattern is shot), and two-dimensional luminance distribution data of red display of the display panel 2 can be obtained, the control unit 8 generates first red luminance correction data by inverting this two-dimensional luminance distribution data.

Similarly to steps 22 and 23, the control unit 8 generates first green luminance correction data for reducing luminance unevenness during green display of the display panel 2, based on the result of detecting the position of the image of the green alignment pattern in step 11 and the image shot of the green image (step 24), and stores the generated green luminance correction data (step 25), and generates first blue luminance correction data for reducing luminance unevenness during blue display of the display panel 2, based on the result of detecting the position of the image of the blue alignment pattern in step 12 and the image shot of the blue test pattern (step 26), and stores the generated blue luminance correction data (step 27).

When the processing by the control unit 8 up to step 27 is completed, the drive unit 5 drives the monochrome camera unit 3 and the color camera unit 4 and causes the color camera 10 to directly face the display panel 2.

Figure 3:
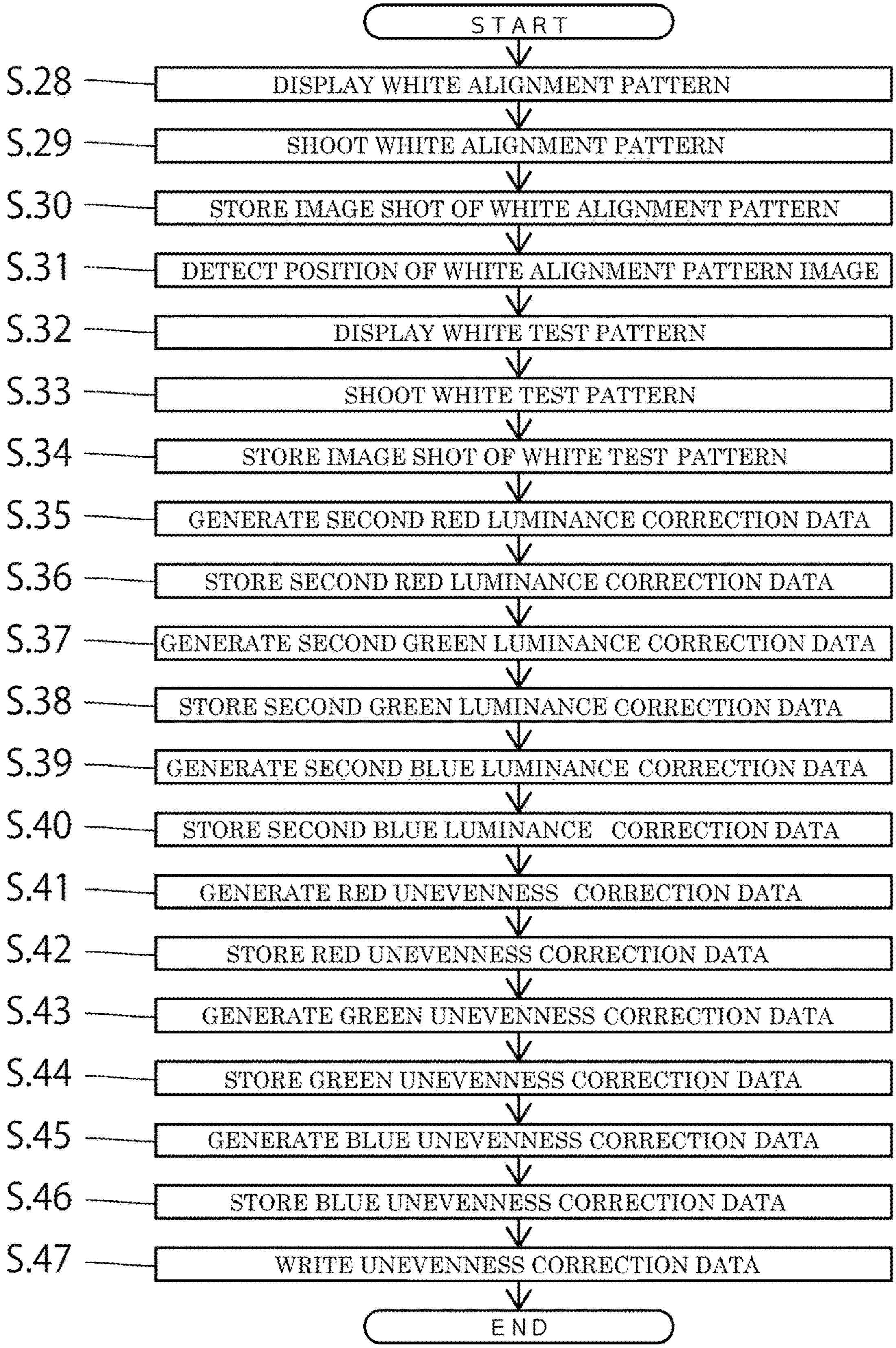
FIG. 3 is a flowchart chronologically showing operations of the unevenness correction data generation device that following on from the flowchart of FIG. 2.

Then, as shown in FIG. 3, the control unit 11 instructs the pattern generation unit 9 to send alignment pattern display signals (R signal, G signal, B signal) to the display panel 2, and causes the display panel 2 to display a white alignment pattern formed by turning on specific pixels of the display panel 2 to perform all color (white) display (step 28 in FIG. 3). The control unit 11 causes the color camera 10 to shoot an image of the display panel 2 on which the white alignment pattern is displayed (step 29), and stores the image shot of the white alignment pattern (step 30).

After finishing this shooting, the control unit 11 detects the position of the image of the white alignment pattern on the imaging surface of the color camera 10, based on the stored image shot of the white alignment pattern (step 31). That is, the control unit 11 detects which imaging elements on the imaging surface of the color camera 10 the image of the specific pixels at the time of white display corresponds to, assuming that dots on the image shot of the white alignment pattern correspond to the specific pixels being turned on to perform white display.

Having detected the position of the image of the alignment pattern on the imaging surface of the color camera 10, the control unit 11 instructs the pattern generation unit 9 to send test pattern display signals (R signal, G signal, B signal) to the display panel 2, so as to cause the display panel 2 to simultaneously (together) display a red image corrected with the first red luminance correction data, a green image corrected with the first green luminance correction data, and a blue image corrected with the first blue luminance correction data, and thus causes the display panel 2 to display a white test pattern (step 32). The white test pattern is a white image that appears white (or gray depending on the gray level) due to all the pixels (all R, G and B subpixels) of the display panel 2 being turned on, and is displayed on the entire surface of the display panel 2.

Next, the control unit 11 causes the color camera 10 to shoot an image of the display panel 2 on which the white test pattern is displayed (step 33), and stores the image shot of the white test pattern (step 34). At this time, the color camera 10 detects the luminance of the red image constituting the white test pattern (red image corrected with first red luminance correction data) with the red luminance detection element, detects the luminance of the green image constituting the white test pattern (green image corrected with first green luminance correction data) with the green luminance detection element, and detects the luminance of the blue image constituting the white test pattern (blue image corrected with first blue luminance correction data) with the blue luminance detection element.

Then, the control unit 11 generates, for the R subpixels, second red luminance correction data for correcting luminance unevenness, based on shooting data of the red image detected by the red luminance detection element (step 35), and stores the generated second red luminance correction data (step 36). That is, because two-dimensional luminance distribution data can be obtained for the red component that is displayed at the time of white display of the display panel 2, the control unit 11 generates the second red luminance correction data by inverting the two-dimensional luminance distribution data. A low pass filter that is used in this step 35 and a high pass filter that is used in step 22 have complementary characteristics whose gains add up to 1.

Similarly to steps 35 and 36, the control unit 11 generates, for the G subpixels, second green luminance correction data for correcting luminance unevenness, based on shooting data of the green image detected by the green luminance detection element (step 37), and stores the generated second green luminance correction data (step 38), and generates, for the B subpixels, second blue luminance correction data for correcting luminance unevenness, based on shooting data of the blue image detected by the blue luminance detection element (step 39), and stores the generated second blue luminance correction data (step 40), thereby generating and storing color correction data for correcting color unevenness of the display panel 2.

Furthermore, the control unit 11 generates red unevenness correction data that is used for correcting the R input signal of the display panel 2, by applying a high pass filter to the first red luminance correction data and applying a low pass filter to the second red luminance correction data to synthesize the first red luminance correction data and the second red luminance correction data, and stores the generated red unevenness correction data (steps 41 and 42), generates green unevenness correction data that is used for correcting the G input signal of the display panel 2, by applying a high pass filter to the first green luminance correction data and applying a low pass filter to the second green luminance correction data to synthesize the first green luminance correction data and the second green luminance correction data, and stores the generated green unevenness correction data (steps 43 and 44), generates blue unevenness correction data that is used for correcting the B input signal of the display panel 2, by applying a high pass filter to the first blue luminance correction data and applying a low pass filter to the second blue luminance correction data to synthesize the first blue luminance correction data and the second blue luminance correction data, and stores the generated blue unevenness correction data (steps 45 and 46), and writes unevenness correction data consisting of the red unevenness correction data, the green unevenness correction data and the blue unevenness correction data to a ROM with the ROM writer 12 (step 47). A display panel with image quality adjustment is completed by attaching an image quality adjustment circuit that is provided with this ROM to the display panel 2, and, as described above, when image signals are input to this display panel with image quality adjustment, the image quality adjustment circuit adds correction values to the input signals with reference to the unevenness correction data written in the ROM, and luminance unevenness of the display panel 2 is suppressed.

The unevenness correction data generation device 1 according to this embodiment includes the pattern generation unit 6 that causes the display panel 2 having pixels that each include R, G and B subpixels to separately display a red image in which all the R subpixels are turned on at the same gray level, a green image in which all the G subpixels are turned on at the same gray level and a blue image in which all the B subpixels are turned on at the same gray level, the monochrome camera 7 that separately shoots the red image, the green image and the blue image displayed on the display panel 2 in monochrome, the control unit 8 that generates, for the R subpixels, first red luminance correction data for correcting luminance unevenness, based on the shooting data of the red image shot by the monochrome camera 7, generates, for the G subpixels, first green luminance correction data for correcting luminance unevenness, based on the shooting data of the green image shot by the monochrome camera 7, and generates, for the B subpixels, first blue luminance correction data for correcting luminance unevenness, based on the shooting data of the blue image shot by the monochrome camera 7, the pattern generation unit 9 that causes the display panel 2 to display a white image by causing the display panel 2 to simultaneously display a red image corrected with the first red luminance correction data, a green image corrected with the first green luminance correction data and a blue image corrected with the first blue luminance correction data, the color camera 10 that shoots the white image displayed on the display panel 2 by the pattern generation unit 9 in color, and the control unit 11 that generates color correction data (second red luminance correction data, second green luminance correction data, second blue luminance correction data) for correcting color unevenness of the display panel 2, based on shooting data of the white image shot by the color camera 10, and generates unevenness correction data that is used for correcting the input signals of the display panel 2, based on the first red luminance correction data, the first green luminance correction data, the first blue luminance correction data and the color correction data, and is thus able to suppress the appearance of color unevenness at the time of turning on R, G and B together, which could possibly appear with only the first red luminance correction data, the first green luminance correction data and the first blue luminance correction data that are generated by shooting in monochrome, by generating unevenness correction data through adding necessary correction to the first red luminance correction data, the first green luminance correction data and the first blue luminance correction data with color correction data that is generated as a result of the white image produced at the time of turning on R, G and B together being shot in color.

Also, although high-definition unevenness correction data can be generated using a high-resolution camera, high-resolution color cameras are very expensive, and thus by setting the monochrome camera 7 of the unevenness correction data generation device 1 to a high resolution, the resolution of the unevenness correction data can be increased without the resolution of the color camera 10 necessarily being high, enabling high-definition unevenness correction data to be obtained at low cost.

In this embodiment, the control unit 11 generates unevenness correction data by applying a high pass filter to the first red luminance correction data and applying a low pass filter to the second red luminance correction data to synthesize the first red luminance correction data and the second red luminance correction data, applying a high pass filter to the first green luminance correction data and applying a low pass filter to the second green luminance correction data to synthesize the first green luminance correction data and the second green luminance correction data, and applying a high pass filter to the first blue luminance correction data and applying a low pass filter to the second blue luminance correction data to synthesize the first blue luminance correction data and the second blue luminance correction data, and thus color unevenness (color unevenness to be corrected with unevenness correction data) that occurs at low spatial frequencies can be captured while avoiding moiré that occurs at high spatial frequencies by applying a low pass filter to the shooting data of the color camera 10, and unevenness (luminance unevenness to be corrected with unevenness correction data) that occurs at high spatial frequencies can also be captured by applying a high pass filter to the shooting data of the monochrome camera 7.

Although a mode for carrying out the present invention is illustrated above, the embodiments of the present invention are not limited to the aforementioned mode, and various modifications and the like may be made as appropriate without departing from the spirit of the invention.

For example, the display panel is not limited to an organic EL panel, and may be a liquid crystal panel, a plasma display, a projection-type projector, a mini LED panel, a micro LED panel, or the like.

Also, unevenness correction data may be generated for each of a plurality of gray levels based on images shot of test patterns of the gray levels, rather than based on an image shot of a test pattern of a single gray level, and the high pass filters and low pass filters are not particularly limited in terms of characteristics and use/non-use of these filters is also optional (high pass filters and low pass filters for red, green and blue usage may have different characteristics for each of the colors red, green and blue).

Furthermore, instead of moving the monochrome camera unit and the color camera unit with the drive unit such that the monochrome camera and the color camera directly face the display panel, the display panel may be moved, or the cameras and the display panel may both be moved, and the cameras and the display panel may be moved manually rather than automatically by a drive unit.

The order in which the red, green and blue alignment patterns and test patterns are shot may also be altered such that the green or blue patterns are shot first rather than the red patterns being shot first, and rather than shooting the test patterns of all the colors after shooting the alignment patterns of all the colors, the test pattern of one of the colors may be shot following shooting of the alignment pattern of that color, and this shooting order may be repeated for the remaining two colors.

On the other hand, it is also possible to substitute the white alignment pattern with a red alignment pattern, green alignment pattern or blue alignment pattern.

LIST OF REFERENCE NUMERALS

1 Unevenness correction data generation device
2 Display panel
6 Pattern generation unit (raster image generation means)
7 Monochrome camera (monochrome shooting means)
8 Control unit (luminance correction data generation means)
9 Pattern generation unit (white image generation means)
10 Color camera (color shooting means)
11 Control unit (color correction data generation means, unevenness correction data generation means)

The invention claimed is:

1. An unevenness correction data generation device comprising:

a raster image generation means for causing a display panel having pixels each including an R subpixel, a G subpixel and a B subpixel to separately display a red image in which all the R subpixels are turned on at the same gray level, a green image in which all the G subpixels are turned on at the same gray level, and a blue image in which all the B subpixels are turned on at the same gray level;

a monochrome shooting means for separately shooting, in monochrome, the red image, green image and blue image displayed on the display panel;

a luminance correction data generation means for generating, for the R subpixels, first red luminance correction data for correcting luminance unevenness, based on shooting data of the red image shot by the monochrome shooting means, generating, for the G subpixels, first green luminance correction data for correcting luminance unevenness, based on shooting data of the green image shot by the monochrome shooting means, and generating, for the B subpixels, first blue luminance correction data for correcting luminance unevenness, based on shooting data of the blue image shot by the monochrome shooting means;

a white image generation means for causing the display panel to display a white image, by causing the display panel to simultaneously display a red image corrected with the first red luminance correction data, a green image corrected with the first green luminance correction data and a blue image corrected with the first blue luminance correction data;

a color shooting means for shooting, in color, the white image displayed on the display panel by the white image generation means;

a color correction data generation means for generating color correction data for correcting color unevenness of the display panel, based on shooting data of the white image shot by the color shooting means; and an unevenness correction data generation means for generating unevenness correction data for use in correcting an input signal of the display panel, based on the first red luminance correction data, the first green luminance correction data, the first blue luminance correction data, and the color correction data.

2. The unevenness correction data generation device according to claim 1, wherein the color shooting means includes:

a red luminance detection element configured to detect a luminance of the red image constituting the white image;

a green luminance detection element configured to detect a luminance of the green image constituting the white image; and a blue luminance detection element configured to detect a luminance of the blue image constituting the white image, the color correction data generation means generates the color correction data, by generating, for the R subpixels, second red luminance correction data for correcting luminance unevenness, based on shooting data of the red image detected by the red luminance detection element, generating, for the G subpixels, second green luminance correction data for correcting luminance unevenness, based on shooting data of the green image detected by the green luminance detection element, and generating, for the B subpixels, second blue luminance correction data for correcting luminance unevenness, based on shooting data of the blue image detected by the blue luminance detection element, and the unevenness correction data generation means generates the unevenness correction data, by synthesizing the first red luminance correction data and the second red luminance correction data, synthesizing the first green luminance correction data and the second green luminance correction data, and synthesizing the first blue luminance correction data and the second blue luminance correction data.

3. The unevenness correction data generation device according to claim 2, wherein the unevenness correction data generation means generates the unevenness correction data, by applying a red high pass filter to the first red luminance correction data and applying a red low pass filter to the second red luminance correction data to synthesize the first red luminance correction data and the second red luminance correction data, applying a green high pass filter to the first green luminance correction data and applying a green low pass filter to the second green luminance correction data to synthesize the first green luminance correction data and the second green luminance correction data, and applying a blue high pass filter to the first blue luminance correction data and applying a blue low pass filter to the second blue luminance correction data to synthesize the first blue luminance correction data and the second blue luminance correction data.

4. The unevenness correction data generation device according to claim 3, wherein the red high pass filter and the red low pass filter have complementary characteristics whose gains add up to 1, the green high pass filter and the green low pass filter have complementary characteristics whose gains add up to 1, and the blue high pass filter and the blue low pass filter have complementary characteristics whose gains add up to 1.

* * * * *